United States Patent
Powell

(10) Patent No.: US 9,963,389 B1
(45) Date of Patent: May 8, 2018

(54) CONCRETE BATCH FORMULATION AND METHOD OF MAKING CONCRETE

(71) Applicant: The National Lime and Stone Company, Findlay, OH (US)

(72) Inventor: Marcus E. Powell, Findlay, OH (US)

(73) Assignee: The National Lime and Stone Company, Findlay, OH (US)

( * ) Notice: Subject to any disclaimer, the term of this patent is extended or adjusted under 35 U.S.C. 154(b) by 0 days. days.

(21) Appl. No.: 14/731,974

(22) Filed: Jun. 5, 2015

Related U.S. Application Data

(60) Provisional application No. 62/009,941, filed on Jun. 10, 2014.

(51) Int. Cl.
*C04B 7/02* (2006.01)
*C04B 14/26* (2006.01)
*C04B 28/04* (2006.01)

(52) U.S. Cl.
CPC .................... *C04B 28/04* (2013.01)

(58) Field of Classification Search
CPC .................. C04B 7/02; C04B 14/26
See application file for complete search history.

(56) References Cited

U.S. PATENT DOCUMENTS

| | | | |
|---|---|---|---|
| 3,853,570 A * | 12/1974 | Nonis | C04B 28/04 106/738 |
| 4,083,679 A | 4/1978 | Bade | |
| 4,135,940 A | 1/1979 | Peltier | |
| 5,853,474 A | 12/1998 | Hilton | |
| 6,676,744 B2 * | 1/2004 | Merkley | C04B 18/24 106/674 |
| 7,030,184 B2 | 4/2006 | Gonnon | |
| 8,182,606 B2 * | 5/2012 | Gleeson | C04B 28/04 106/644 |
| 2001/0047741 A1 * | 12/2001 | Gleeson | C04B 28/04 106/709 |
| 2002/0162485 A1 * | 11/2002 | Jodlbauer | C04B 22/06 106/724 |
| 2003/0005861 A1 * | 1/2003 | Dietrich | C04B 40/0608 106/727 |
| 2005/0241543 A1 * | 11/2005 | Hagen | B63H 3/008 106/805 |
| 2013/0203899 A1 * | 8/2013 | Kuryatnyk | C04B 24/045 524/5 |
| 2014/0311387 A1 * | 10/2014 | Hohn | C04B 28/02 106/805 |

FOREIGN PATENT DOCUMENTS

GB   2085865   * 5/1982

* cited by examiner

*Primary Examiner* — Paul D Marcantoni
(74) *Attorney, Agent, or Firm* — Marshall & Melhorn, LLC

(57) ABSTRACT

A batch composition for concrete includes a cementious material and aggregate material, the cementious material including at least 50% Portland cement and at least 1% of a dolomite mineral filler. The batch composition may be mixed with sufficient water to cause the cementious material in the batch composition to set and bind the entire mass to form a concrete.

8 Claims, No Drawings

CONCRETE BATCH FORMULATION AND METHOD OF MAKING CONCRETE

CROSS-REFERENCE TO RELATED APPLICATION

This application is claiming the benefit, under 35 U.S. C. 119(e), of the provisional application which was granted Ser. No. 62/009,941 and filed on Jun. 10, 2014, the entire disclosure of which is hereby incorporated by reference.

BACKGROUND OF THE INVENTION

The invention relates to the use of a dolomite mineral filler ("DMF") as an ingredient to enhance the strength characteristics of concrete while decreasing use of hydraulic binders proportionately.

Concrete is a hard, strong material made by mixing a cementious material (commonly Portland cement) and a mineral aggregate (such as washed sand and gravel or broken rock) with sufficient water to cause the cement to set and bind the entire mass. The mixture may also contain admixtures, or other cementious materials (such as ground blast furnace slag or fly ash), or both. The Portland cement, ground blast furnace slag, or fly ash typically found in cement blends are powdered materials sized to pass a 325 mesh (44 micron) sieve.

SUMMARY OF THE INVENTION

In accordance with the invention, a batch composition for concrete includes a cementious material and aggregate material, the cementious material including at least 50% Portland cement and at least 1% of a dolomite mineral filler.

In a further aspect of the invention, such batch composition may be mixed with sufficient water to cause the cementious material in the batch composition to set and bind the entire mass to form a concrete.

By replacing amounts of, for example, Portland cement, ground granulated blast furnace slag and fly ash with DMF, the compressive strength of the cured cement/concrete matrix may be enhanced.

DETAILED DESCRIPTION OF THE INVENTION

It is to be understood that the specific compositions and processes described in the following description are simply exemplary embodiments of the inventive concepts defined in the appended claims. Hence, specific compositions and properties relating to the embodiments disclosed herein should not be considered as limiting, unless the claims expressly state otherwise. Unless otherwise specifically stated otherwise, all percentages referred to are by weight.

The invention provides a batch composition for concrete that includes a cementious material and aggregate material, the cementious material including at least 50% Portland cement and at least 1% of a dolomite mineral filler. The Portland cement is as defined by ASTM C150 Type I/II.

The DMF of the present invention is a dry powdered calcium magnesium carbonate, preferably having a moisture content of 0.2 weight % or less and a broader range of particle sizes than is evident in Portland cement or other conventional hydraulic binder materials. The DMF may be a granular powder, powder, or very fine powder material.

The granular powder DMF used in accordance with the invention has a sizing of 99% or more passing the 20 mesh sieve, 5% to 75% passing the 50 mesh sieve, 35% to 65% passing the 100 mesh sieve, 5% to 35% passing the 200 mesh sieve, and no more than 15% passing the 325 mesh sieve.

The powder DMF used in accordance with the invention has a sizing of 90% or more passing the 100 mesh sieve, with 50% or more passing the 200 mesh sieve, but with no more than 40% passing the 325 mesh sieve. Even more preferably, the sizing of the powder DMF used in the invention is 97% or more passing the 100 mesh sieve, with 80% or more passing the 200 mesh sieve, but with no more than 65% passing the 325 mesh sieve.

The very fine powder DMF used in accordance with the invention has a sizing of 90% or more passing the 325 mesh sieve.

Although not wishing to be bound to any particular theory, it is felt that introducing DMF into a blend of Portland cement and other hydraulic binder materials (or as a single Portland cement replacement) creates a mixture with a broader spectrum of particle sizes enabling better consolidation of the cement paste, which results in a stronger cured cement matrix.

It is also suspected that the presence of DMF in the cement mixture provides additional nucleation sites enhancing opportunities for additional cement crystallization (the process which gives rise to compressive strength in concrete).

The following examples are presented solely for the purpose of further illustrating and disclosing the present invention, and are not to be construed as a limitation on the invention.

Examples

Test results for a series of test batches of concrete are shown in the Table. All compositional percentages are "weight %."

The "Control Mix", "Trial Mix", and other batches identified as "Lab" were prepared with bench scale equipment in a laboratory environment, and as set forth in ASTM C 192, "Making and Curing Concrete Test Specimens in the Laboratory." The mixes identified as "Field" were prepared using a commercial ready-mix plant process, and as set forth in ASTM C 685, "Concrete Made By Volumetric Batching and Continuous Mixing."

The Control Mix (shown in column C) had the following composition (per cubic yard): 564 pounds of hydraulic binder material; 1245 pounds of crushed coarse dolomite aggregate meeting AASHTO #57 material specification; 710 pounds of crushed intermediate aggregate meeting AASHTO #8 material specification; 1056 pounds of coarse sand meeting AASHTO #703.02 material specification.

This mix (with air entrainment) was designed to attain 4,000 psi compressive strength at 28 days.

The same composition (except for the noted changes in the makeup of the hydraulic binder material) was used for all the experimental batches shown in the Table, columns D through 0. The dolomite mineral fillers identified as DMF1 and DMF2 (powder), DMF3 (granular powder), and DMF4

(very fine powder) were the same apart from their respective particle size distributions, as set forth in rows 16-20 of the Table.

The "Trial Mix" batch (shown in column D) maintains the same Portland cement (419 lbs.) and slag content (90 lbs.) as the Control Mix, but adds DMF1 (55 lbs.) in place of fly ash (i.e., ~10% of the hydraulic binder material has been replaced by DMF). This cement mixture produced concrete having compressive strength of 6,310 psi at 28 days far exceeding the 4,000 psi design for the Control Mix.

The "Mix 1 Lab" batch (shown in column E) maintains the same slag content (90 lbs.) and fly ash content (—0— lbs.) as the Trial Mix, but increases DMF1 to 94 lbs. and reduces Portland cement to 380 lbs. Compared to the Control Mix, 17% of the hydraulic binder material has been replaced by DMF. This cement mixture produced concrete having compressive strength of 5,100 psi at 28 days exceeding the 4,000 psi design for the Control Mix.

The "Mix 1 Field" batch (shown in column F) duplicates the "Mix 1 Lab" batch using a ready-mix plant process. The cement mixture produced concrete having compressive strength of 5,240 psi at 28 days exceeding the 4,000 psi design for the Control Mix.

The "Mix 4 Lab" batch (shown in column G) also duplicates the "Mix 1 Lab" batch except that the DMF1 was replaced by DMF2. This cement mixture produced concrete having compressive strength of 4,730 psi at 28 days exceeding the 4,000 psi design for the Control Mix.

The "Mix 9 Lab" batch (shown in column H) also duplicates the "Mix 1 Lab" batch except that the DMF1 was replaced by DMF3. This cement mixture produced concrete having compressive strength of 5,570 psi at 28 days exceeding the 4,000 psi design for the Control Mix.

The "Mix 11 Lab" batch (shown in column I) also duplicates the "Mix 1 Lab" batch except that the DMF1 was replaced by DMF4. This cement mixture produced concrete having compressive strength of 5,280 psi at 28 days exceeding the 4,000 psi design for the Control Mix.

The "Mix 5 Field" batch (shown in column J) maintains the same slag content (90 lbs.) and fly ash content (—0— lbs.) as the Trial Mix, but increases DMF1 to 115 lbs. and reduces Portland cement to 359 lbs. Compared to the Control Mix, 20% of the hydraulic binder material has been replaced by DMF. This cement mixture produced concrete having compressive strength of 5,310 psi at 28 days, exceeding the 4,000 psi design for the Control Mix.

The "Mix 6 Field" batch (shown in column K) contains only Portland cement (449 lbs.) and DMF1 (115 lbs.). Compared to the Control Mix, 20% of the hydraulic binder material has been replaced by DMF. This cement mixture produced concrete having compressive strength of 4,840 psi at 28 days, exceeding the 4,000 psi design for the Control Mix.

The "Mix 2 Lab" batch (shown in column L) maintains the same slag content (90 lbs.) and fly ash content (—0— lbs.) as the Trial Mix, but increases DMF1 to 142 lbs. and further reduces Portland cement to 332 lbs. Compared to the Control Mix, 25% of the hydraulic binder material has been replaced by DMF. This cement mixture produced concrete having compressive strength of 4,280 psi at 28 days exceeding the 4,000 psi design for the Control Mix.

The "Mix 2 Field" batch (shown in column M) duplicates the "Mix 2 Lab" batch using a ready-mix plant process. This cement mixture produced concrete having compressive strength of 3,960 psi at 28 days nearly matching the 4,000 psi design for the Control Mix.

The "Mix 3 Lab" batch (shown in column N) maintains the same slag content (90 lbs.) and fly ash content (—0— lbs.) as the Trial Mix, but increases DMF1 to 190 lbs. and further reduces Portland cement to 284 lbs. Compared to the Control Mix, 34% of the hydraulic binder material has been replaced by DMF. This cement mixture produced concrete having compressive strength of 3,420 psi at 28 days.

The "Mix 3 Field" batch (shown in column 0) duplicates the "Mix 3 Lab" batch using a ready-mix plant process. This cement mixture produced concrete having compressive strength of 3,200 psi at 28 days.

The chemistry of the DMF in each of the examples was around 54% $CaCO_3$ and around 44% $MgCO_3$. The water required for normal consistency of DMF1 (as described in the Table) according to ASTM C187 was 22.50%, and the methylene blue value C595 (using AASHTO T330) was 0.5 mg/g.

TABLE

| A | B | C<br>Control<br>Mix | D<br>Trial<br>Mix | E<br>Mix 1<br>Lab | F<br>Mix 1<br>Field | G<br>Mix 4<br>Lab | H<br>Mix 9<br>Lab | I<br>Mix 11<br>Lab | J<br>Mix 5<br>Field | K<br>Mix 6<br>Field | L<br>Mix 2<br>Lab | M<br>Mix 2<br>Field | N<br>Mix 3<br>Lab | O<br>Mix 3<br>Field |
|---|---|---|---|---|---|---|---|---|---|---|---|---|---|---|
| Powder Ingredients (Pounds per CY) | Portland Cement (lbs) | 419 | 419 | 380 | 380 | 380 | 380 | 380 | 359 | 449 | 332 | 332 | 284 | 284 |
| | GGBFS (lbs) | 90 | 90 | 90 | 90 | 90 | 90 | 90 | 90 | 0 | 90 | 90 | 90 | 90 |
| | DMF 1 (lbs) | 0 | 55 | 94 | 94 | 0 | 0 | 0 | 115 | 115 | 142 | 142 | 190 | 190 |
| | DMF 2 (lbs) | 0 | 0 | 0 | 0 | 94 | 0 | 0 | 0 | 0 | 0 | 0 | 0 | 0 |
| | DMF 3 (lbs) | 0 | 0 | 0 | 0 | 0 | 94 | 0 | 0 | 0 | 0 | 0 | 0 | 0 |
| | DMF 4 (lbs) | 0 | 0 | 0 | 0 | 0 | 0 | 94 | 0 | 0 | 0 | 0 | 0 | 0 |
| | Fly Ash (lbs) | 55 | 0 | 0 | 0 | 0 | 0 | 0 | 0 | 0 | 0 | 0 | 0 | 0 |
| | Total Powder Content | 564 | 564 | 564 | 564 | 564 | 564 | 564 | 564 | 564 | 564 | 564 | 564 | 564 |

TABLE-continued

| A | B | C Control Mix | D Trial Mix | E Mix 1 Lab | F Mix 1 Field | G Mix 4 Lab | H Mix 9 Lab | I Mix 11 Lab | J Mix 5 Field | K Mix 6 Field | L Mix 2 Lab | M Mix 2 Field | N Mix 3 Lab | O Mix 3 Field |
|---|---|---|---|---|---|---|---|---|---|---|---|---|---|---|
| Proportions of Powder Ingredients | Portland Cement | 74% | 74% | 67% | 67% | 67% | 67% | 67% | 64% | 80% | 59% | 59% | 50% | 50% |
| | Other Hydraulic Binder | 26% | 16% | 16% | 16% | 16% | 16% | 16% | 16% | 0% | 16% | 16% | 16% | 16% |
| | DMF | 0% | 10% | 17% | 17% | 17% | 17% | 17% | 20% | 20% | 25% | 25% | 34% | 34% |
| | % Passing US 20 Mesh | | 100% | 100% | 100% | 100% | 100% | 100% | 100% | 100% | 100% | 100% | 100% | 100% |
| | % Passing US 30 Mesh | | 100% | 100% | 100% | 100% | 99% | 100% | 100% | 100% | 100% | 100% | 100% | 100% |
| | % Passing US 100 Mesh | | 99% | 99% | 99% | 90% | 55% | 100% | 99% | 99% | 99% | 99% | 99% | 99% |
| | % Passing US 200 Mesh | | 87% | 87% | 87% | 55% | 15% | 99+% | 87% | 87% | 87% | 87% | 87% | 87% |
| | % Passing US 325 Mesh | | 58% | 58% | 58% | 38% (est) | 6% | 97% | 58% | 58% | 58% | 58% | 58% | 58% |
| Admixes | Air, ASTM C231 | 8% | 5% | 6.7% | 4% | 6.7% | 6.0% | 6.0% | 5.50% | 6.60% | 7% | 6.60% | 7.1% | 6.40% |
| | MRWR, oz/cwt | 6 | 6 | 6 | 6 | 6 | 6 | 6 | 6 | 6 | 6 | 6 | 6 | 6 |
| | Water/Cement Ratio | 0.45 | 0.45 | 0.45 | 0.45 | 0.39 | 0.45 | 0.45 | 0.45 | 0.45 | 0.45 | 0.45 | 0.45 | 0.45 |
| | Slump, ASTM C143 | 4.25" | 6.5" | 3.5" | 4" | 3.75" | 4" | 4" | 3.75" | 4" | 4.5" | 6.5" | 3.75" | 6" |
| Compression Tests (psi) (ASTM C39) | 3 Day Avg. | 1607 | | 2670 | 2175 | 2490 | 2880 | 2920 | 1890 | 2770 | 1930 | 1523 | 1450 | 1143 |
| | 7 Day Avg. | 2487 | 4437 | 3720 | 3820 | 3380 | 3770 | 3720 | 3470 | 3847 | 2830 | 2737 | 2340 | 2173 |
| | 14 Day Avg. | | | 4450 | | 4160 | 4670 | 4503 | | | 3540 | | 3050 | |
| | 28 Day Avg. | 3730 | 6310 | 5100 | 5240 | 4730 | 5570 | 5280 | 5310 | 4840 | 4280 | 3960 | 3420 | 3200 |

The compositions of the invention thus comprise a cementious material and aggregate material, the cementious material including at least 50% Portland cement and at least 1% DMF. Even more preferably, the cementious material includes at least 10% DMF.

The DMF may be a granular powder, powder, or very fine powder material.

The granular powder DMF used in accordance with the invention has a sizing of 99% or more passing the 20 mesh sieve, 5% to 75% passing the 50 mesh sieve, 35% to 65% passing the 100 mesh sieve, 5% to 35% passing the 200 mesh sieve, and no more than 15% passing the 325 mesh sieve.

The powder DMF used in accordance with the invention has a sizing of 90% or more passing the 100 mesh sieve, with 50% or more passing the 200 mesh sieve, but with no more than 40% passing the 325 mesh sieve. Even more preferably, the sizing of powder DMF used in the invention is 97% or more passing the 100 mesh sieve, with 80% or more passing the 200 mesh sieve, but with no more than 65% passing the 325 mesh sieve.

The very fine powder DMF used in accordance with the invention has a sizing of 90% or more passing the 325 mesh sieve.

The compositions of the invention are mixed with sufficient water to cause the cementious materials therein to set and bind the entire mass to form a concrete. Typically, the mixture is on the order of 5 to 6% water.

In accordance with the provisions of the patent statutes, the present invention has been described in what is considered to represent its preferred embodiment.

However, it should be noted that the invention can be practiced otherwise than as described without departing from its spirit and scope.

What is claimed is:
1. A batch composition for concrete comprising a cementious material and aggregate material, the cementious material including at least 50% by weight Portland cement and at least 1% by weight dolomite mineral filler, and the aggregate material comprising coarse dolomite aggregate having a sizing of 95 to 100% passing a 1 inch sieve and 25 to 60% passing a 0.50 inch sieve.

2. The batch composition of claim 1, wherein the cementious material includes at least 10% dolomite mineral filler.

3. The batch composition of claim 1, wherein the dolomite mineral filler is a granular powder, powder, a very fine powder material, or mixtures thereof.

4. The batch composition of claim 1, wherein the dolomite mineral filler is a granular powder having a sizing of 99% or more passing a 20 mesh sieve, 5% to 75% passing a 50 mesh sieve, 35% to 65% passing a 100 mesh sieve, 5% to 35% passing a 200 mesh sieve, and no more than 15% passing the 325 mesh sieve.

5. The batch composition of claim 1, wherein the dolomite mineral filler is a powder having a sizing of 90% or more passing a 100 mesh sieve, 50% or more passing a 200 mesh sieve, and no more than 40% passing a 325 mesh sieve.

6. The batch composition of claim 5, wherein the dolomite mineral filler is a powder having a sizing of 97% or more passing a 100 mesh sieve, 80% or more passing a 200 mesh sieve, and no more than 65% passing a 325 mesh sieve.

7. The batch composition of claim 1, wherein the dolomite mineral filler is a very fine powder having a sizing of 90% or more passing a 325 mesh sieve.

8. The batch composition of claim 1, wherein the dolomite mineral filler has a moisture content of 0.2 weight %.

\* \* \* \* \*

UNITED STATES PATENT AND TRADEMARK OFFICE
CERTIFICATE OF CORRECTION

PATENT NO. : 9,963,389 B1
APPLICATION NO. : 14/731974
DATED : May 8, 2018
INVENTOR(S) : Marcus E. Powell Page 1 of 1

It is certified that error appears in the above-identified patent and that said Letters Patent is hereby corrected as shown below:

Column 5, Column A of the "Table", beneath "Proportions of Powder Ingredients" add --Particle Size Distribution for DMF--

Signed and Sealed this
Twenty-eighth Day of August, 2018

Andrei Iancu
*Director of the United States Patent and Trademark Office*